Feb. 26, 1963 J. B. GROENEWEGEN 3,079,056
SWITCHABLE DRIVE SYSTEM
Filed Sept. 11, 1961
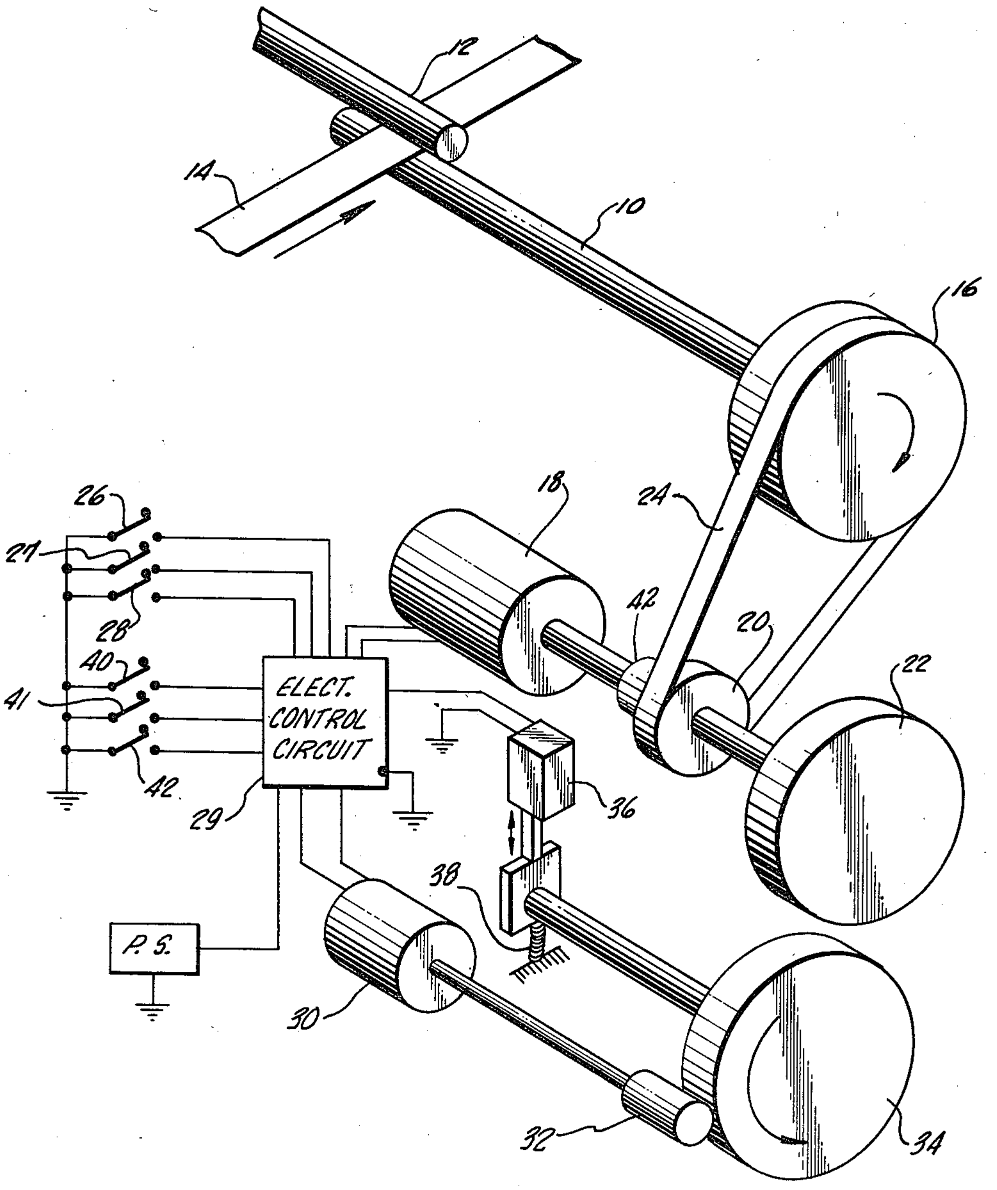
INVENTOR.
JOHANNES B. GROENEWEGEN
BY
Christie, Parker & Hale
ATTORNEYS.

United States Patent Office 3,079,056
Patented Feb. 26, 1963

3,079,056
SWITCHABLE DRIVE SYSTEM

Johannes B. Groenewegen, San Dimas, Calif., assignor to Consolidated Electrodynamics Corporation, Pasadena, Calif., a corporation of California Filed Sept. 11, 1961, Ser. No. 137,208
8 Claims. (Cl. 226—178)

This invention relates to a speed drive system and, more particularly, to a switchable multiple speed drive system utilizable for transporting magnetic tape and the like.

At the present time magnetic tape systems are required to transport tape at a plurality of speeds that may vary anywhere from 1⅞ inches to 120 inches per second. Speed ranges on this order are particularly required on instrumentation type magnetic recorders used in missile ranging and the like. It is well known that the drive system for magnetic tape apparatus must provide a smooth drive and not introduce speed inaccuracies productive of wow and flutter. To minimize these speed irregularities, the conventional capstan-pinch roller drive arrangement has been controlled by means of a hysteresis synchronous motor because of the smooth speed characteristics thereof. In addition, the hysteresis synchronous motor can provide a plurality of speeds that are electrically switchable by simply switching in and out the motor poles. The drive motors that are commercially available for drive systems of this type are generally limited in the speed ranges that are available, and do not provide four to six speeds and which speeds are desirable in magnetic tape apparatus.

It has been found that such speed ranges are not possible with commercially available motors without resorting to custom designed equipment. Although these speed ranges are possible by resorting to conventional clutch and speed change gearing arrangements, it has been found that these mechanical arrangements tend to degrade the performance of the tape apparatus by introducing undesirable speed inaccuracies. In addition, it has been found that with motors operating at very low speeds, for example speeds for transporting the tape on the order of 1⅞ inches or 3¾ inches per second, the motor shafts rotate at such low speeds that wow and flutter are introduced into the tape system and such low speeds therefore must be avoided. Accordingly, a multiple speed drive system that can be accurately controlled and switchable between the multiplicity of speeds without introducing speed irregularities into the system is desired and, particularly, such a multiple speed system is desirable wherein six speed ranges are possible for use in magnetic tape apparatus.

The present invention provides an improved and simple arrangement for providing multiple speeds without resorting to gear shifting arrangements and that is completely electrically switchable between speeds without introducing any speed irregularities into the system. The present multiple speed arrangement comprises an inexpensive arrangement of commercially available equipment for producing at least six different speeds utilizable for transporting magnetic tape.

The multiple speed drive system of the present invention as it may be utilized in a magnetic tape arrangement comprises a capstan that is driven at multiple speeds, in this instance six speeds. The capstan is driven through the provision of a high speed motor that provides the driving action for the higher ranges of speeds and a low speed motor providing the remaining speed ranges. The high speed motor is coupled to a flywheel for the capstan to directly drive the capstan at the desired high speeds and also includes an idler roller mounted on its shaft to be rotatable therewith. The low speed motor also may include a low-speed driving member mounted on its shaft to be rotatable therewith and cooperating with a friction driving member positioned intermediate the low speed driving member and the idler of the high speed motor. The friction driving member is arranged to be normally spaced from the idler and the low speed driving member and to be positioned into driving engagement with both of them for driving the capstan through the idler when the high speed motor is de-energized and the low speed motor is energized. The low speed driving member, idler member, and friction driving member are defined with respect to one another to provide a predetermined speed reduction in accordance with the desired low speed range for the drive system and, in the same fashion, the capstan, flywheel, and pulley may be defined to provide a desired speed reduction for defining the high speed ranges for the drive system. In one particular embodiment the motors comprise hysteresis synchronous motors and, therefore, are readily switchable within their speed ranges and between motors to cause the entire drive system to be readily electrically switchable between speeds.

These and other features of the present invention may be more fully appreciated when considered in the light of the following specification and in accordance with the single drawing which is a diagrammatic representation of the multiple speed drive system as utilized in magnetic tape apparatus and embodying the invention.

The multiple speed drive system of the present invention is applicable to various drive arrangements and will be described as it is employed in a magnetic tape system merely to simplify the description of the invention. Its application to other arrangements will be readily evident to those skilled in the art.

Now referring to the drawing, the invention will be described in more detail. The driven member is shown as a capstan 10 arranged in driving relationship with the movable pinch roller 12 for driving a magnetic tape 14 therebetween when the pinch roller is placed into a driving relationship with the capstan in the usual fashion. The capstan 10 is shown mounting a flywheel 16 adjacent one end for maintaining a smooth capstan speed. The flywheel 16 is driven by a high speed motor 18, preferably a hysteresis synchronous motor, having a pulley 20 mounted on its shaft to be rotatable therewith and a rigid idler 22 also mounted on the motor shaft. The high speed motor 18 directly drives the capstan 10 through the provision of a drive belt 24 mounted between the pulley 20 and the flywheel 16. The drive motor 18 preferably has three speed ranges and which speed ranges are higher than the highest transporting speeds at which it is desired to drive the tape 14. To this end, the diameters of the pulley 20 and the flywheel 16 are defined relative to one another to produce a speed reduction on the order of 2:1, for example. The tape 14, therefore, may be driven at any one of the three speeds characteristic of the drive motor 18 and is electrically switchable between these speeds in a conventional fashion. The selection of the particular drive speed for the high speed motor 18 is accomplished by the usual switching arrangement illustrated diagrammatically by the three switches 26, 27, and 28 coupled to a conventional motor control circuit 29. As embodied in a magnetic tape apparatus, the transporting rates of the tape 14 when a 2:1 reduction for each of three speeds of the motors provides tape rates of 30, 60, and 120 inches per second.

To obtain lower tape transport rates, for example, 3¾, 7½, and 15 inches per second, a second or low speed drive motor 30 is utilized in combination with the pulley 20 and idler 22 mounted to the high speed motor 18. The low speed motor 30 may include a driving member 32 mounted on its shaft to be rotatable therewith. A rotatable friction drive member, such as a rubber idler 34, is positioned intermediate the idler 22 and the drive member 32. The friction driving member 34 is normally spaced from both the idler 22 and the drive member 32 but is adapted to be placed into driving engagement with both. The positioning means for the friction driving member 34 may comprise a conventional solenoid arrangement, such as the solenoid 36, which is adapted to place the member 34 into driving engagement with the idler 22 and the drive member 32 upon energization thereof. A spring 38 may be connected to the mounting means for the friction drive member 34 to normally maintain it out of engagement with the idler 22 and the drive member 32 and to return it to this position upon de-energization of the solenoid 36.

The low speed motor 30 preferably has a speed range above the low speeds that normally introduce the speed irregularities into a magnetic drive system, commonly termed cogging. The motor 30 further is preferably in the form of a hysteresis synchronous motor having three switchable speed ranges to allow it to be smoothly switched between each speed without introducing the undesirable speed irregularities leading to wow and flutter in the tape 14. Since the speed range for the low speed motor 30 is above that required to complete the low driving speed rates for the tape 14, the idler 22, the drive member 32, and the friction driving member 34 are provided with diameters defined with respect to one another to produce a speed reduction in accordance with this desired speed range. In the magnetic tape apparatus disclosed to provide speed ranges from 3¾ to 15 inches per second in three steps related by a ratio of 2:1, an 8:1 reduction in speed has been found to be convenient.

It will be recognized that the electrical control circuit 29 for switching between the three speeds provided by the motors 18 and 30 is conventional and, therefore, need not be described in detail. Suffice it to say that the motors 18 and 30 are alternately and selectively energized by one of the switches individual thereto and when one of the switches 40, 41, or 42 for the low speed motor 30 is actuated the switching arrangement is such that it not only de-energizes the high speed motor 18 and energizes the low speed motor 30 but also energizes the solenoid 36 substantially simultaneously therewith. In some applications it may be necessary to include a time delay arrangement for delaying the time of energization of the low speed motor 30 a predetermined interval after the solenoid 36 is energized to allow it to place the friction driving member 34 in driving engagement with the idler 22 and the drive member 32.

From the above description of the structural organization of the invention, it should be evident that to drive the tape 14 through the six different speeds that range from 3¾ to 120 inches per second with each step having a ratio of 2:1 relative to the adjacent step, the three higher transport rates of 30, 60, and 120 inches per second are realized through the actuation of the correct switch 26–28 for the high speed motor 14 whereby the flywheel 16 and thereby the capstan 10 is directly driven by this motor by means of the pulley 20. When the lower three speed ranges are desired, one of the switches 40–42 are actuated in accordance with the desired tape transport rate and, therefore, the high speed motor is de-energized if it had been previously energized, and the solenoid 36 is first energized to position the friction drive member 34 in driving engagement with the idler 22 and the drive member 32 and then the low speed motor 30 is energized. Under these operating conditions the driving member 32 drives the idler 22 through the friction driving member 34 and causes the shaft for the high speed motor 18 to rotate and thereby the pulley 20 is effective to drive the flywheel 16 and thereby the capstan 10.

It should be noted that the pulley 20 may be stepped as indicated in dotted lines at 42 to provide any desired speed relationship other than that indicated above, namely 3¾ through 120 inches per second. For example, by simply providing a pulley 20 defining a 4:1 speed reduction, six different speeds ranging from 1⅞ to 60 inches per second may be provided for the tape apparatus and which six speed ranges will have the aforementioned 2:1 relationship. It should be noted that no change in the 8:1 relationship between the drive member 32 and the idler 22 is necessary when the belt 24 is mounted on the pulley for a 4:1 speed reduction. In addition, non-standard tape drive speeds may be provided through a selection of pulley ratios and the like.

It should now be evident that the above invention provides an improved multiple speed drive system that is simple, economical, and employs commercially available units without resorting to custom designs and the like and is simply electrically switchable between speeds.

What is claimed is:

1. A multiple speed drive including a driven member, a first multiple speed motor having a shaft coupled for rotation therewith, a roller mounted on the shaft of the first motor to be rotatable therewith, means for coupling said driven member to said shaft of the first motor to be directly driven therefrom, a second multiple speed motor having a speed range lower than the speed range of said first motor and having a shaft coupled for rotation therewith, an idler normally spaced from said roller and the shaft of said second motor and adapted to move into a driven relationship with the roller and the shaft of the second motor to drive the roller and thereby said driven member, means for selectively positioning said idler into said driven-drive relationship, and switchable means coupled to each of said motors and said latter-mentioned means for selectively energizing either said first or said second motor and selecting the desired speed thereof while actuating said positioning means substantially simultaneously with the energization of said second motor.

2. A multiple speed drive as defined in claim 1 wherein said idler is a rubber drive wheel and said means for positioning said idler comprises a solenoid.

3. A multiple speed drive for tape apparatus and the like including a driven member, a first multiple speed motor having a shaft coupled for rotation therewith, a first roller mounted on the shaft of the first motor to be rotatable therewith, means for coupling said driven member to said shaft to be directly driven therefrom, a second multiple speed motor having a speed range lower than the speed range of said first motor and having a shaft coupled for rotation therewith, a second roller mounted on the shaft of the second motor to be rotatable therewith, a friction drive member spaced intermediate and normally separated from the rollers mounted on said motor shafts and adapted to be moved into a driven relationship with the roller for said second motor to drive the roller for said first motor and thereby said driven member, said rollers and said friction drive member being defined to provide a predetermined speed reduction for driving said driven member below the speed of said second motor, electromagnetic means for selectively positioning said friction drive member into said driven-drive relationship, and switchable means coupled to each of said motors and said latter-mentioned means for selectively energizing either said first or second motor and selecting the desired speed thereof while actuating said positioning means substantially simultaneously with the energization of said second motor.

4. A multiple speed drive for tape apparatus and the like as defined in claim 3 wherein said coupling means includes a stepped pulley mounted on the shaft of said first motor and a belt coupled to said pulley and said driven member.

5. In magnetic tape apparatus and the like including a capstan for driving magnetic tape, a flywheel, means for coupling the flywheel to said capstan for driving the capstan in response to rotation of the flywheel, a relatively high speed motor having a plurality of different speeds within its speed range and having a shaft coupled for rotation therewith, an idler member mounted for rotation with the shaft of the high speed motor, a pulley mounted on said shaft to be rotatable therewith, a drive belt coupled between said pulley and said flywheel for driving the latter upon the energization of the high speed motor, a low speed motor having a plurality of different speeds below the speed range of said high speed motor and having a shaft coupled for rotation with the low speed motor, a rotatable friction drive member mounted in a spaced relationship with said first-mentioned idler and the shaft for said low speed motor and adapted to be positioned into engagement with the idler and the shaft of the second motor to thereby cause the flywheel to be driven by the low speed motor upon the energization thereof and after the high speed motor is de-energized, means for controlling the position of said friction drive member, and electrical switch means for energizing either the high or low speed motor and selecting the desired speed thereof while actuating said positioning means substantially simultaneously with the energization of said low speed motor.

6. A switchable drive system capable of providing at least six drive speeds and electrically switchable between each drive speed including a drive member, a flywheel, means for coupling the flywheel to said drive member for driving the drive member in response to rotation thereof, a relatively high speed motor having at least three different speeds and having a shaft coupled for rotation therewith, an idler member mounted to be rotatable with the shaft of the high speed motor, a pulley mounted on said shaft to be rotatable therewith, a drive belt coupled between said pulley and said flywheel for driving the latter upon the energization of the motor, said flywheel and pulley being defined to provide a predetermined speed reduction to thereby define the three high speeds of the six speed drive system, a low speed motor having at least three different speeds, a driving member, means for coupling the driving member to the low speed motor for rotation therewith, a rotatable friction drive member mounted in a spaced relationship with said idler and said driving member for said low speed motor and adapted to be positioned into engagement with the idler and the driving member to thereby cause the flywheel to be driven by the low speed motor upon the energization thereof and after the high speed motor is de-energized, said friction drive member, driving member, and idler member being defined relative to one another to provide a predetermined speed reduction whereby the three lower driving speeds of said drive system are defined below said three high speeds, means for controlling the position of said friction drive member, and electrical switch means for energizing either the high or low speed motor and selecting the desired speed thereof while actuating said positioning means substantially simultaneously with the energization of said low speed motor.

7. A multiple speed drive system for magnetic tape apparatus capable of smoothly driving magnetic tape over a speed range covering tape speeds of 3¾ to 120 inches per second in six steps having a ratio of 2:1 between steps and which drive system comprises a capstan for driving the magnetic tape, a flywheel, means for coupling the flywheel to said capstan to drive the capstan in response to rotation of the flywheel, a relatively high speed hysteresis synchronous motor having three different speeds and electrically switchable between said three speeds, said high speed motor having a shaft member coupled for rotation therewith, a rigid idler member and a pulley coupled to the shaft to be rotatable therewith, a drive belt coupled between said pulley and said flywheel for driving the latter upon the energization of said motor, said pulley and flywheel being defined relative to one another to provide a 2:1 speed reduction whereby one of the three high speeds of said drive system is provided upon the energization and selection of one of the three speeds for said high speed motor, a low speed hysteresis synchronous motor having at least three different speeds, the speeds of said low speed motor being above the low speed that normally causes speed irregularities in a magnetic tape drive system and electrically switchable between each of said three speeds, said low speed motor having a shaft coupled for rotation therewith, a rigid driving member mounted to the shaft of said low speed motor, a rotatable friction drive member mounted intermediate and spaced from said driving member and said rigid idler and adapted to be positioned into engagement with the driving member and the idler whereby the flywheel and thereby the capstan is driven by means of said low speed motor upon the energization thereof, solenoid means for placing said friction drive member into engagement with said driving member and said rigid idler member during the energization thereof, said driving member, friction drive member, and said rigid idler being defined relative to one another to produce an 8:1 speed reduction of the speed provided by said low speed motor whereby the three speeds provided by said motor comprise the three lower speeds for said tape apparatus, and electrical switch means for energizing either the high or low speed motor at one of their three speeds and coupled to said solenoid for energizing same substantially simultaneously with the selection of one of the three low speeds of said drive system.

8. A multiple speed drive system of the type defined in claim 7 wherein the tape speeds may be simply modified to cover a range of 1⅞ to 60 inches per second through the provision of a stepped pulley providing an additional speed reduction of the ratio of 4:1 rather than 2:1 to provide six speeds having a 2:1 ratio for the latter tape speeds.

References Cited in the file of this patent

UNITED STATES PATENTS 2,963,555 Brubaker ---------------- Dec. 6, 1960